United States Patent
Kobayashi et al.

(10) Patent No.: US 6,901,741 B2
(45) Date of Patent: Jun. 7, 2005

(54) DIAGNOSIS OF DETERIORATION IN AIR/FUEL RATIO SENSOR

(75) Inventors: Hideaki Kobayashi, Yokohama (JP); Rie Takatsuto, Yokohama (JP); Masato Kobayashi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 7 days.

(21) Appl. No.: 10/351,356

(22) Filed: Jan. 27, 2003

(65) Prior Publication Data

US 2003/0159432 A1 Aug. 28, 2003

(30) Foreign Application Priority Data

Feb. 28, 2002 (JP) ........................................ 2002-053237

(51) Int. Cl.$^7$ ................................................. F01N 3/00
(52) U.S. Cl. ......................... 60/274; 60/276; 60/277; 60/285; 73/23.32; 123/198 F; 123/481
(58) Field of Search ........................ 60/274, 276, 277, 60/285; 73/23.31, 23.32; 118.1, 118.2; 123/198 F, 481, 479, 688; 701/109, 114

(56) References Cited

U.S. PATENT DOCUMENTS

| | | | |
|---|---|---|---|
| 5,724,952 A | * | 3/1998 | Miyashita et al. .......... 123/688 |
| 5,842,340 A | | 12/1998 | Bush et al. |
| 5,845,489 A | * | 12/1998 | Dohta et al. .................. 60/276 |
| 5,901,691 A | * | 5/1999 | Katoh ......................... 123/688 |
| 6,227,033 B1 | * | 5/2001 | Kainz ......................... 73/23.32 |
| 6,374,818 B2 | * | 4/2002 | Shinjyo et al. .............. 123/688 |
| 6,446,429 B2 | * | 9/2002 | Kobayashi et al. ............ 60/285 |

FOREIGN PATENT DOCUMENTS

| | | |
|---|---|---|
| JP | 8-285808 A | 11/1996 |
| WO | WO 01/61165 A1 | 8/2001 |

* cited by examiner

*Primary Examiner*—Tu M. Nguyen
(74) *Attorney, Agent, or Firm*—Foley & Lardner LLP

(57) ABSTRACT

An air/fuel ratio sensor (4) and a three-way catalytic converter (3A) having an oxygen storage function are provided in an exhaust passage (2) of an internal combustion engine (1). A controller (6) runs the engine (1) under the alternating application of a stoichiometric air/fuel ratio and a rich air/fuel ratio, and a diagnosis of deterioration in the air/fuel ratio sensor (4) is performed on the basis of the amplitude of variation in the air/fuel ratio detected by the air/fuel ratio sensor (4). By executing the diagnosis only immediately after a fuel cut, the amount of oxygen stored in the three-way catalytic converter (3A) at the start point of the diagnosis is equal to the maximum amount. When the rich air/fuel ratio is applied, the converter (3A) releases the stored oxygen to maintain the exhaust gas purification performance of the converter (13).

11 Claims, 7 Drawing Sheets

4 AIR/FUEL RATIO SENSOR
5 OXYGEN SENSOR
9 AIR FLOW METER
10 WATER TEMPERATURE SENSOR
12 CRANK ANGLE SENSOR
13 FUEL INJECTOR
14 SPARK PLUG

4 AIR/FUEL RATIO SENSOR
5 OXYGEN SENSOR
9 AIR FLOW METER
10 WATER TEMPERATURE SENSOR
12 CRANK ANGLE SENSOR
13 FUEL INJECTOR
14 SPARK PLUG

DIAGNOSIS OF DETERIORATION IN AIR/FUEL RATIO SENSOR

FIELD OF THE INVENTION

This invention relates to fuel supply control in an internal combustion engine with respect to the diagnosis of deterioration in an air/fuel ratio sensor.

BACKGROUND OF THE INVENTION

Tokkai H8-285808 published by the Japanese Patent Office in 1996 discloses a device for diagnosing deterioration in an air/fuel ratio sensor which is provided in the exhaust passage of an internal combustion engine. In this prior art, a determination is made as to whether the air/fuel ratio sensor has deteriorated or not by performing air/fuel ratio feedback control of the engine and comparing change in a feedback correction coefficient and change in the air/fuel ratio detected by the air/fuel ratio sensor.

SUMMARY OF THE INVENTION

In order to diagnose deterioration in the air/fuel ratio sensor in the device according to the prior art, it is preferable for the air/fuel ratio to change at a greater amplitude than a predetermined amplitude.

In typical fuel injection control, however, variation in the air/fuel ratio is sometimes small, making it difficult to perform a determination as to the deterioration of the air/fuel ratio sensor with a high degree of precision. In order to determine the deterioration of the air/fuel ratio sensor with a high degree of precision, it is preferable to perform control of the fuel injection amount such that variation in the air/fuel ratio is purposely increased to exceed the variation region during normal operations. However, such air /fuel ratio variation causes undesirable effects on the engine such as deterioration of the exhaust gas composition and rotational variation.

It is therefore an object of this invention to determine deterioration in an air/fuel ratio sensor with a high degree of precision and without affecting the running performance of an engine or the exhaust gas composition thereof.

In order to achieve the above object, this invention provides a deterioration diagnosis device of an air/fuel ratio sensor for use with an internal combustion engine. The engine burns an air/fuel mixture of fuel injected by an injector and air, and discharges combustion gas through an exhaust passage as exhaust gas. The engine comprises a catalytic converter provided in the exhaust passage and having an oxygen storage function. The air/fuel ratio sensor is disposed in the exhaust passage upstream of the catalytic converter for detecting an air/fuel ratio of the air-fuel mixture.

The deterioration diagnosis device comprising a controller functioning to determine whether a fuel cut, during which fuel is not injected by the fuel injector while the engine is running, has been executed or not, control a fuel injection amount of the fuel injector only immediately after an execution of a fuel cut to cause the engine to be operated under an alternating application of differing air/fuel ratios, and perform a diagnosis of deterioration in the air/fuel ratio sensor based on a variation in the air/fuel ratio detected by the air/fuel ratio sensor during the period in which the engine is operated under the alternating application of the differing air/fuel ratios.

This invention also provides a method for diagnosing deterioration of the air/fuel ratio sensor. The method comprises determining whether a fuel cut, during which fuel is not injected by the fuel injector while the engine is running, has been executed or not, controlling a fuel injection amount of the fuel injector only immediately after an execution of a fuel cut to cause the engine to be operated under an alternating application of differing air/fuel ratios, and performing a diagnosis of deterioration in the air/fuel ratio sensor based on a variation in the air/fuel ratio detected by the air/fuel ratio sensor during the period in which the engine is operated under the alternating application of the differing air/fuel ratios.

The details as well as other features and advantages of this invention are set forth in the remainder of the specification and are shown in the accompanying drawings.

DESCRIPTION OF THE PREFERRED EMBODIMENTS

Figure 1:
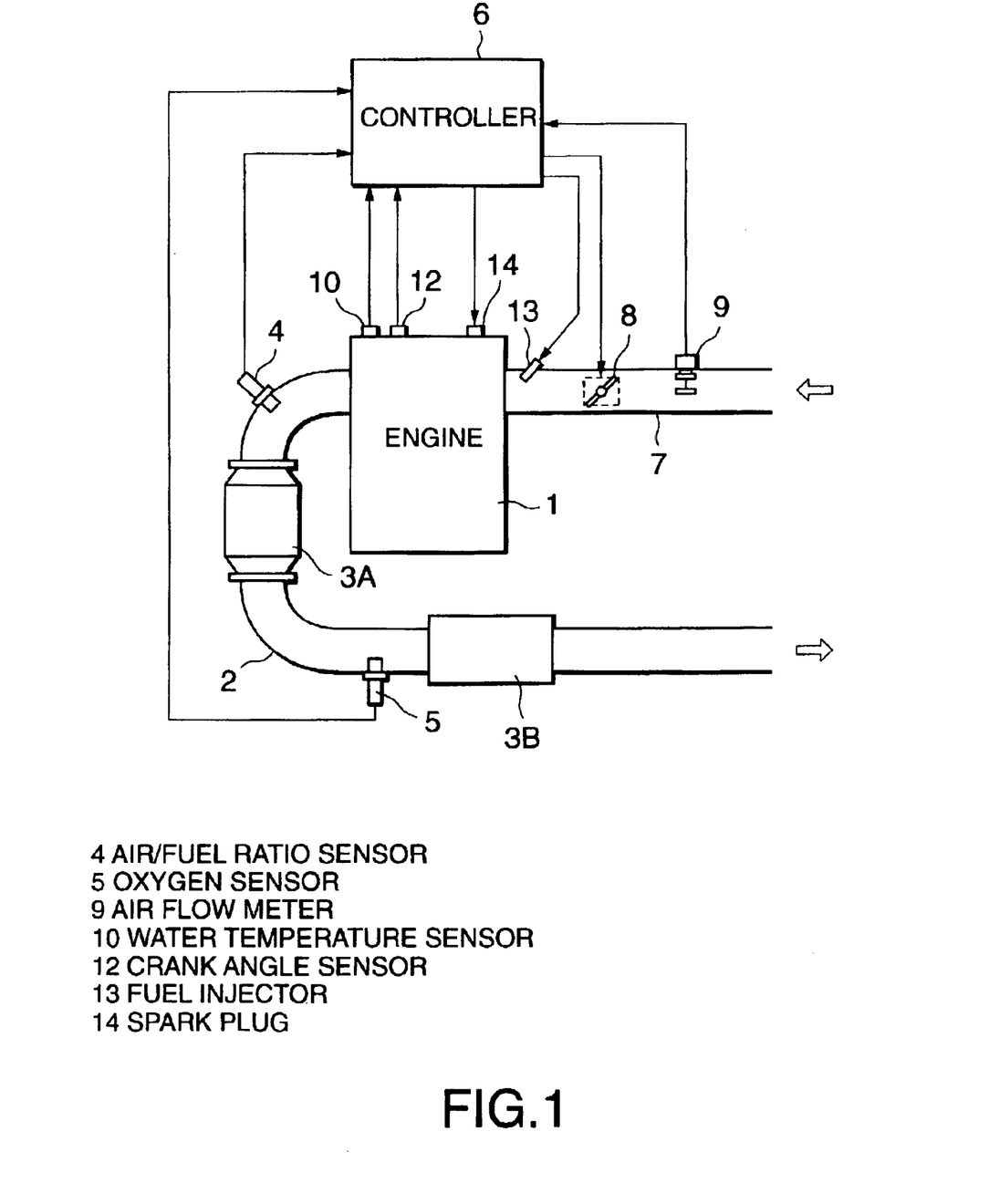
FIG. 1 is a schematic diagram of a fuel control device for an engine according to this invention.

Referring to FIG. 1 of the drawings, a spark ignition internal combustion gasoline engine 1 for a vehicle has a fuel injector 13 which injects gasoline fuel into air which is aspirated from a suction pipe 7 to produce an air/fuel mixture, and a spark plug 14 which ignites the air/fuel mixture to promote combustion.

Combustion gas is discharged from an exhaust pipe 2 as exhaust gas.

An electronic throttle 8 for adjusting the amount of intake air is provided in the suction pipe 7.

Two catalytic converters 3A and 3B are provided in series in the exhaust pipe 7 for exhaust gas purification.

Each of the catalytic converters 3A and 3B houses a three-way catalyst supported on a substrate. The three-way catalyst functions to reduce nitrogen oxides (NOx) and oxidize carbon monoxide (CO) and hydrocarbon (HC) comprised in the exhaust gas when the air/fuel ratio of the air/fuel mixture burned in the engine 1 is at or in the vicinity of the stoichiometric air/fuel ratio. The substrate which supports the three-way catalyst is covered by an oxygen storage material such as ceria. When the air/fuel ratio of the air/fuel mixture for combustion is lean, oxygen is comprised in the exhaust gas, and the oxygen storage material functions to temporarily store the oxygen in the exhaust gas so that when the air/fuel ratio of the air/fuel mixture for combustion becomes rich, the stored oxygen is released.

The fuel injection amount of the fuel injector 13, the ignition timing of the spark plug 14, and the opening of the electronic throttle 8 are controlled by signals from a controller 6.

The controller 6 is constituted by a microcomputer comprising a central processing unit (CPU), read-only memory (ROM), random access memory (RAM), and an input/output interface (I/O interface). The controller may be constituted by a plurality of microcomputers.

The controller 6 performs feedback control of the fuel injection amount of the fuel injector 13 such that the catalytic converters 3A and 3B function at an optimum level.

For the purposes of this control, an air/fuel ratio sensor 4 is provided in the exhaust pipe 2 upstream of the catalytic converter 3A, and an oxygen sensor 5 is provided between the catalytic converter 3A and the catalytic converter 3B. The air/fuel ratio sensor 4 is constituted by a so-called universal exhaust gas oxygen sensor which is capable of detecting the air/fuel ratio of the air/fuel mixture that has been burned by the engine 1 over a wide range from lean to rich. The oxygen sensor 5, on the other hand, is a sensor which reacts to the oxygen concentration in exhaust gas to cause a sudden change in output voltage with an oxygen concentration corresponding to the stoichiometric air/fuel ratio as a boundary. A zirconia oxygen sensor, for example, is known as this type of sensor. The oxygen sensor 5 may also be constituted by a universal exhaust gas oxygen sensor.

An air flow meter 9 for detecting the intake air amount of the engine 1, a water temperature sensor 10 for detecting the temperature of cooling water in the engine 1, and a crank angle sensor 12 for detecting a predetermined rotational position and the rotation speed of the engine 1 are also provided.

The detection values of these sensors are each input into the controller 6 as signals. It should be noted that the signal of the crank angle sensor 12 comprises a rotation speed signal and a Ref signal corresponding to the predetermined rotational position.

In the feedback control of the fuel injection amount, the controller 6 calculates the oxygen storage amount in the three-way catalyst of the catalytic converter 3A, and controls the fuel injection amount of the fuel injector 13 such that the oxygen storage amount is held at an intermediate target value between zero and saturation, while the air/fuel ratio detected by the oxygen sensor 5 is maintained at the stoichiometric air/fuel ratio. This air/fuel ratio control taking the oxygen storage amount into account is known from WO01/61165A1, published by the WPO on Aug. 23, 2001.

The fuel injection amount is expressed by the pulse width of a pulse width modulation signal which is output to the fuel injector 13 synchronously with the Ref signal. The fuel injector 13 is provided with a nozzle which opens over a time period corresponding to the pulse width of the input pulse signal, and an amount of fuel commensurate with the opening period of the nozzle is injected. The controller 6 increases and decreases the fuel injection amount by increasing and decreasing the pulse width of the pulse signal which is output to the fuel injector 13.

During engine braking or the like, however, the controller 6 executes a so-called fuel cut in which the fuel injection amount is set at zero and air/fuel ratio feedback control is not performed. The engine 1 also aspirates air during a fuel cut. The intake air is discharged from the exhaust passage 2 as is, and hence at this time the exhaust gas comprises a large amount of oxygen. In other words, during a fuel cut, the three-way catalytic converters 3A and 3B store a large amount of oxygen.

The controller 6 performs a diagnosis of whether or not the air/fuel ratio sensor 4 has deteriorated only immediately after a fuel cut. This diagnosis is executed on the basis of open-loop control of the air/fuel ratio which is set specifically for the purpose of this diagnosis.

Figure 2A:
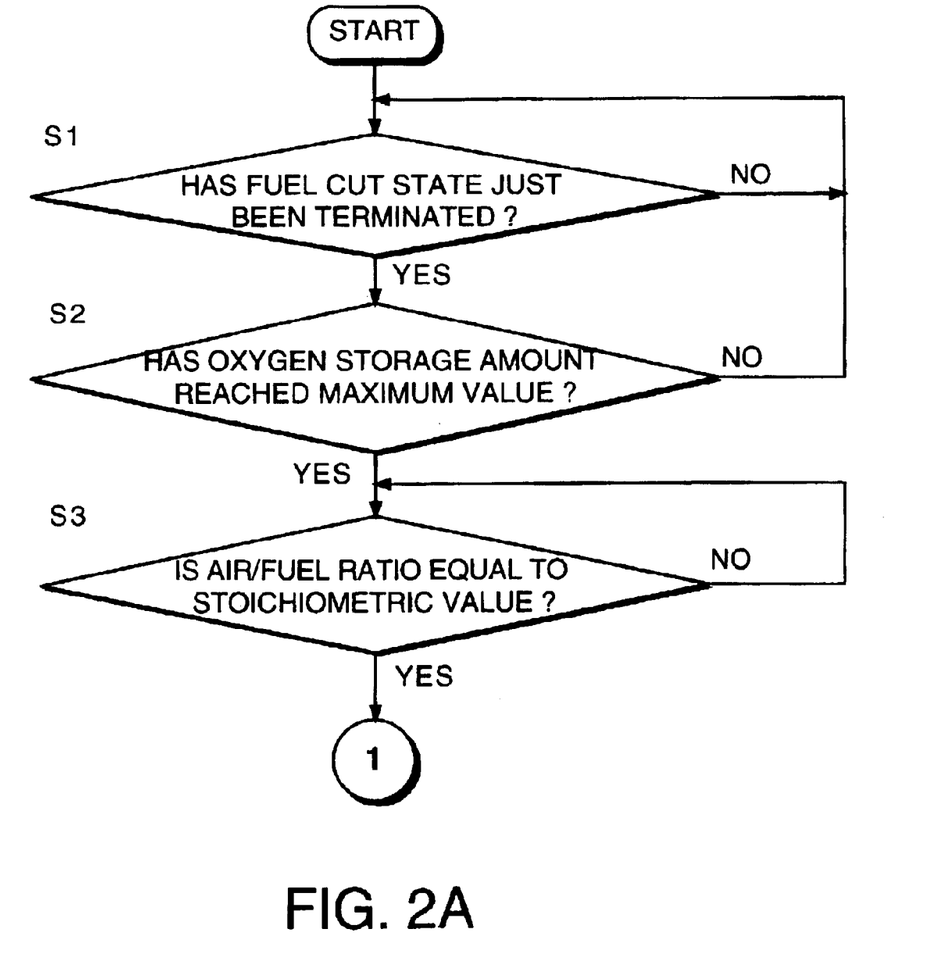
FIGS. 2A and 2B are a flowchart illustrating a fuel control routine executed by a controller according to this invention.
Figure 2B:
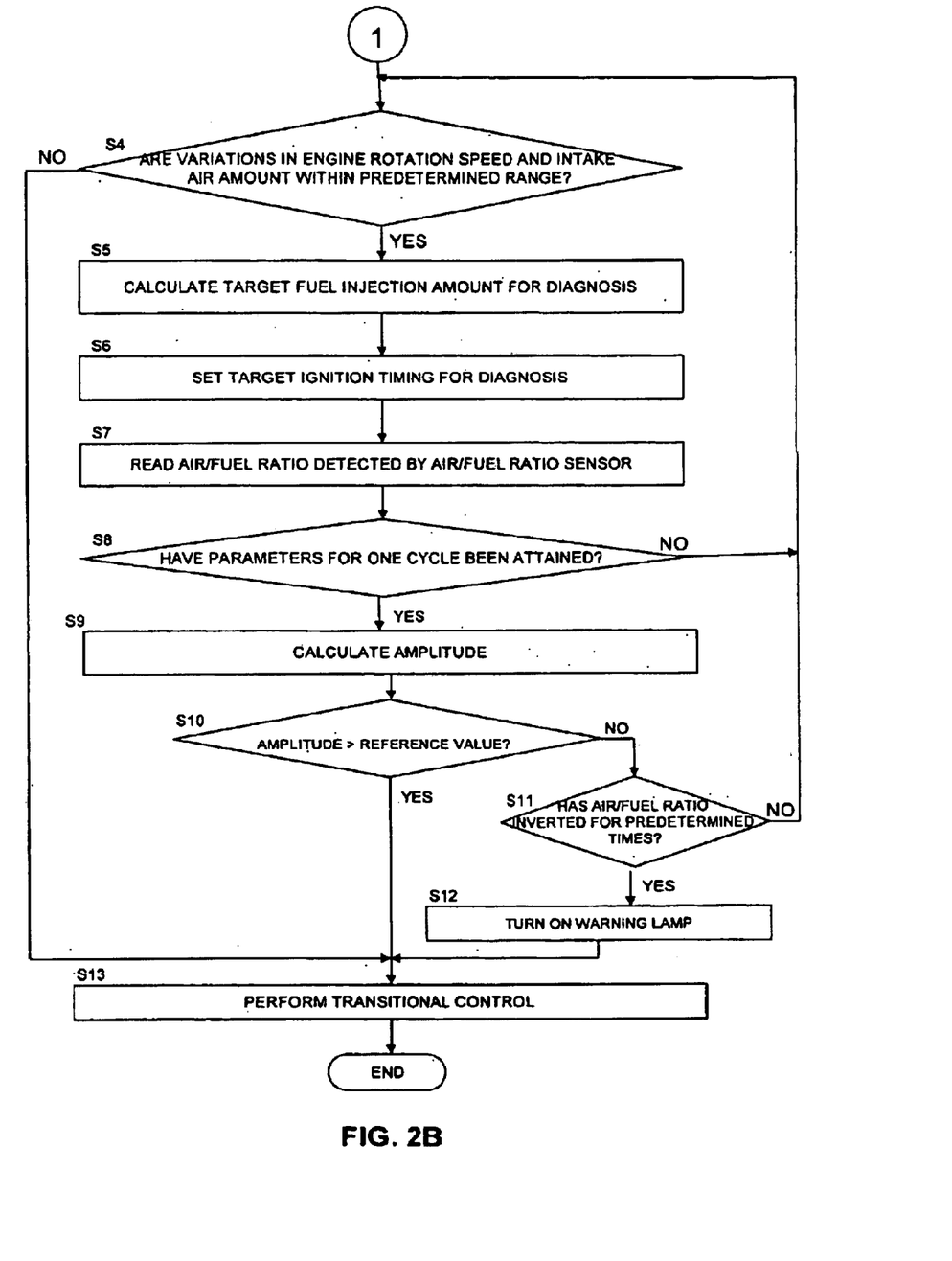

Next, referring to FIGS. 2A and 2B, the routine for diagnosing deterioration of the air/fuel ratio sensor 4, executed by the controller 6, will be described. This routine is executed only once while the engine 1 is running.

First, in a step S1, the controller 6 determines whether a fuel cut state has just been terminated or not. Here, a fuel cut state indicates that fuel injection is not being performed by the fuel injector 13, and for example, engine braking indicates a fuel cut state. The controller 6 waits until the end of the fuel cut, without performing the processing in the subsequent steps.

A diagnosis of deterioration in the air/fuel ratio sensor 4, which is performed with the application of air/fuel ratio change, is only performed immediately after a fuel cut for the following reason. That is, during a fuel cut, the intake air of the engine 1 is discharged through the exhaust passage 2 as is, and therefore a large amount of oxygen is stored in the three-way catalytic converters 3A and 3B. As a result, even when oxygen is insufficient upon application of a rich air/fuel ratio during a diagnosis of catalyst deterioration performed after a fuel cut, the catalytic converters 3A and 3B are capable of releasing the large amount of stored oxygen to maintain the three-way catalyst atmosphere at an oxygen concentration corresponding to the stoichiometric air/fuel ratio. In other words, deterioration of the exhaust gas composition accompanying a deterioration diagnosis can be prevented.

When it is determined that the fuel cut has terminated in the step S1, the controller 6 determines whether or not the oxygen storage amount in the catalytic converter 3A has reached the maximum storage amount in a step S2. The calculation method of the oxygen storage amount and the maximum storage amount are known from U.S. Pat. No. 5,842,340, WO01/61165, and the aforementioned Tokkai H8-285808, and thus description thereof is omitted here. During a fuel cut, the engine 1 does not perform combustion, and the air aspirated by the suction pipe 7 is discharged through the exhaust pipe 2 as is. Thus, when the fuel cut continues for a fixed time period, the oxygen storage amount in the catalytic converter 3A reaches the maximum storage amount.

If the oxygen storage amount has not reached the maximum storage amount, the controller 6 repeats the determination in steps S1 and S2 until the determination results of the steps S1 and S2 are both affirmative. Accordingly, processing to move to a step S3 is performed only immediately after a fuel cut and when the oxygen storage amount has reached the maximum storage amount. In other words, diagnosis of deterioration in the air/fuel ratio sensor 4 is not executed until a fuel cut is executed after the engine 1 has started running and as a result the oxygen storage amount in the catalytic converter 3A reaches the maximum storage amount.

When it is determined in the step S2 that the oxygen storage amount in the catalytic converter 3A has reached the maximum allowable amount, the controller 6 determines in a step S3 whether or not the air/fuel ratio detected by the air/fuel ratio sensor 4 is equal to the stoichiometric air/fuel ratio. Although not shown in the flowchart, feedback control of the fuel injection amount is executed in this state according to another routine with the stoichiometric air/fuel ratio as a target air/fuel ratio.

To explain the feedback control of the fuel injection amount, a target injection pulse width of the fuel injector 13 is expressed according to the following expression (1).

$$Ti = Tp \cdot TFBYA \cdot \alpha + Ts \quad (1)$$

where, Ti=target injection pulse width,

Tp=basic injection pulse width,

TFBYA=target equivalence ratio
=(stoichiometric air/fuel ratio)/(target air/fuel ratio), α=air/fuel ratio feedback correction coefficient, and Ts=ineffectual pulse width.

The basic injection pulse width Tp is a value determined by the intake air amount and rotation speed of the engine 1, and calculation thereof is known from U.S. Pat. No. 5,529,043. The ineffectual pulse width Ts is dependent upon the state of charge of the battery in the vehicle.

The air/fuel ratio feedback correction coefficient α is expressed by the following expression (2) according to well-known proportional-integral-derivative control (PID control).

$$\alpha = dAF \cdot PGain + \Sigma dAF \cdot IGain + \Delta dAF \cdot DGain + 1 \quad (2)$$

where $$dAF = \frac{\text{real air/fuel ratio} - \text{target air/fuel ratio}}{\text{real air/fuel ratio}},$$

PGain=proportional gain,

IGain=integral gain, and

DGain=derivative gain.

That is, the target injection pulse width Ti is calculated with the difference between the target air/fuel ratio and the real air/fuel ratio as a parameter such that this difference is eliminated. A pulse modulation signal Corresponding to the calculated target injection pulse width Ti is output to the fuel injector 13 at a next fuel injection timing.

Returning to the description of the routine, when the real air/fuel ratio detected by the air/fuel ratio sensor 4 in the step S3 is not equal to the stoichiometric air/fuel ratio, the controller 6 waits until the air/fuel ratio detected by the air/fuel ratio sensor 4 becomes equal to the stoichiometric air/fuel ratio.

Once the air/fuel ratio detected by the air/fuel ratio sensor 4 has become equal to the stoichiometric air/fuel ratio, the controller 6 determines in a step S4 whether or not variation in the engine rotation speed detected by the crank angle sensor 12 and variation in the intake air amount detected by the air flow meter 9 respectively exceed a predetermined range.

If either of these variations exceeds the predetermined range, it is determined that conditions for a diagnosis of deterioration in the air/fuel ratio sensor 4 have not been established, whereupon the deterioration diagnosis in the following steps S5 through S11 is cancelled and the processing in a step S13 is performed. The processing of the step S13 will be described later. The engine rotation speed and intake air amount vary in excess of the predetermined range when the accelerator pedal of the vehicle is fully depressed, for example, and in such a case the controller 6 does not perform deterioration diagnosis of the air/fuel ratio sensor 4. Further, if diagnosis has already begun, the diagnosis is halted.

When both the engine rotation speed and the intake air amount are within the predetermined range, the controller 6 interrupts the fuel injection amount feedback control according to the other routine in which the stoichiometric air/fuel ratio is set as the target air/fuel ratio, and executes the deterioration diagnosis of the steps S5 through S11.

In the deterioration diagnosis of the air/fuel ratio sensor 4, the controller 6 performs open-loop control of the fuel injection amount such that an air/fuel ratio corresponding to the stoichiometric air/fuel ratio and a rich air/fuel ratio are alternated at predetermined intervals. The ignition timing of the spark plug 14 is adjusted correspondingly.

Figure 3:
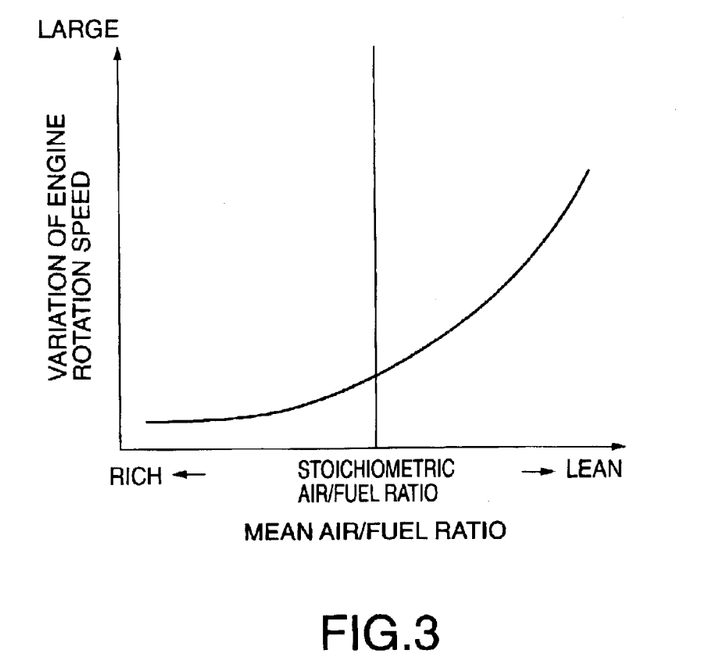
FIG. 3 is a diagram illustrating the relationship between air/fuel ratio and rotational variation in the engine.

The reason for performing deterioration diagnosis with alternating application of an air/fuel ratio corresponding to the stoichiometric air/fuel ratio and a rich air/fuel ratio is as follows. It is possible to perform deterioration diagnosis using a lean air/fuel ratio, but, as is illustrated in FIG. 3, rotation variation of the engine 1 with respect to air/fuel ratio change is more likely to occur as the air/fuel ratio becomes leaner. Hence, in order to perform deterioration diagnosis unaccompanied by rotation variation in the engine 1, it is desirable for diagnosis to be performed using a rich air/fuel ratio.

Figure 4A:
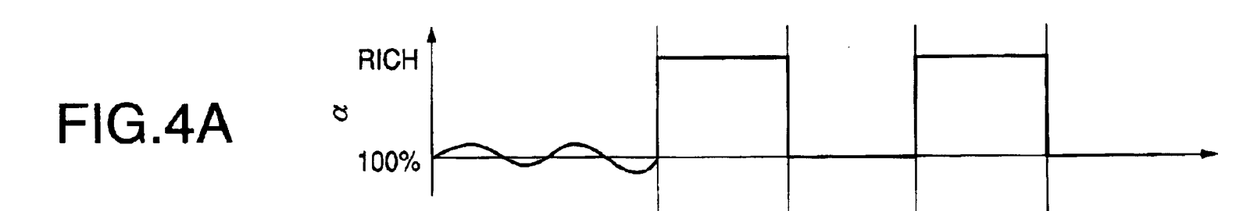
FIGS. 4A through 4C are timing charts illustrating the relationship between fuel injection amount control and ignition timing control executed by the controller.
Figure 4B:
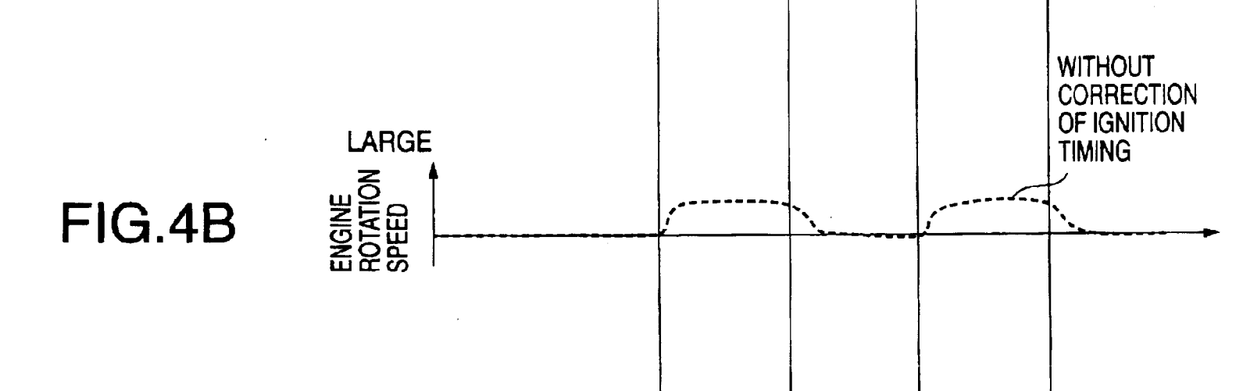
Figure 4C:
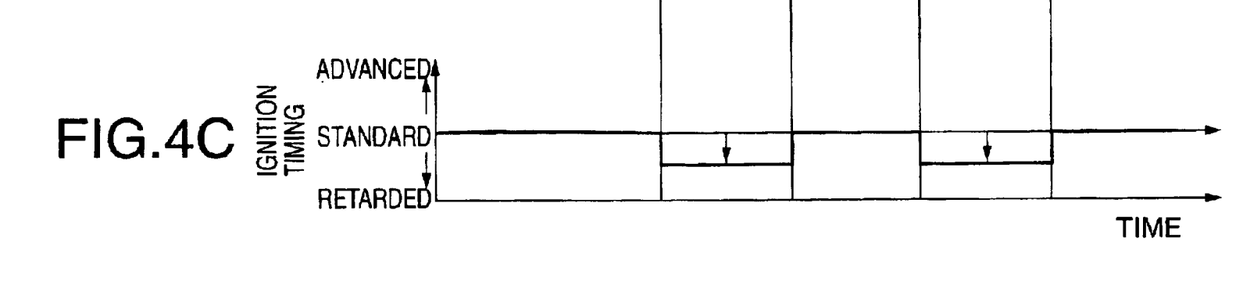

Referring to FIGS. 4A through 4C, an outline of this control will be described. In FIG. 4A, a rich air/fuel ratio and a stoichiometric air/fuel ratio are alternated as the target air/fuel ratio at fixed time periods. Here, the air/fuel ratio feedback correction coefficient α indicated by 100% corresponds to the stoichiometric air/fuel ratio. The stoichiometric air/fuel ratio is achieved by setting the air/fuel ratio feedback correction coefficient α at 1.0 while maintaining the target equivalence ratio at a value corresponding to the stoichiometric air/fuel ratio. The rich air/fuel ratio is achieved by setting the air/fuel ratio feedback correction coefficient α at a fixed value larger than 1.0 while maintaining the target equivalence ratio at the value corresponding to the stoichiometric air/fuel ratio. In the following description, the time period during which the stoichiometric air/fuel ratio is applied is named a stoichiometric air/fuel section and the time period during which the rich air/fuel ratio is applied is named a rich air/fuel ratio section.

Open-loop control of the fuel injection amount signifies the clamping of the air/fuel ratio feedback correction coefficient α applied in the expression (1) at any fixed value, i.e., 1.0 or a value larger than 1.0 while maintaining the target equivalence ratio at the value corresponding to the stoichiometric air/fuel ratio.

Returning now to FIGS. 2A and 2B, in the step S5, the controller 6 first determines whether the present timing corresponds to the rich air/fuel ratio section illustrated by the rectangular wave in FIG. 4A, and in the rich air/fuel ratio section, the controller 6 calculates the target fuel injection pulse width Ti corresponding to the rich air/fuel ratio as described above. The pulse signal corresponding to the target fuel injection pulse width Ti is output to the fuel injector 13 on the next occasion when fuel injection is performed by the fuel injector 13. When the present timing does not correspond to the rich air/fuel ratio section, or in other words when the present timing corresponds to the stoichiometric air/fuel section, the controller 6 calculates the target fuel injection pulse width Ti corresponding to the stoichiometric air/fuel ratio by fixing the value of a at 1.0. The pulse signal corresponding to the target fuel injection pulse width Ti is output to the fuel injector 13 on the next occasion when fuel injection is performed by the fuel injector 13.

Similarly, in the following step S6, the output timing of an ignition signal to the spark plug 14 in the rich air/fuel ratio section is set to have a predetermined angle of retardation, as illustrated in FIG. 4C. In the stoichiometric air/fuel ratio section, The output timing of the ignition signal is set equal to the standard timing. As a result, the ignition signal is output to the spark plug 14 at the set timing. The spark plug 14 performs ignition in response to the ignition signal. When the air/fuel ratio changes drastically, as is illustrated in FIG. 4A, the engine rotation speed may vary as shown by the broken line in FIG. 4B. The ignition timing is retarded in order to prevent such rotation variation.

Although not indicated in the flowchart, the rich air/fuel ratio section and the stoichiometric air/fuel ratio section are identified in the following manner. That is, in the step S5, the controller 6 counts the time elapsed since the start of the first rich air/fuel ratio section, and on the basis of the elapsed time determines if the present timing corresponds to the rich air/fuel ratio section or the stoichiometric air/fuel ratio section. It should be noted that the lengths of the rich air/fuel ratio section and the stoichiometric air/fuel ratio section are previously given as fixed values.

In the following step S7, the controller 6 reads the actual air/fuel ratio detected by the air/fuel ratio sensor 4. The read real air/fuel ratio values are successively stored in memory as parameters each time the processing of the step S7 is executed. The read actual air/fuel ratios are used later for determining the amplitude of variation in the real air/fuel ratio, the amplitude of the actual air/fuel ratio varying dependent on the intake air amount of the engine 1.

Specifically, the amplitude of the actual air/fuel ratio decreases as the intake air amount decreases. In other words, irregularities detected from the amplitude of air/fuel ratio variation at a certain intake air amount tend not to be detected at a smaller air intake amount.

Figure 5:
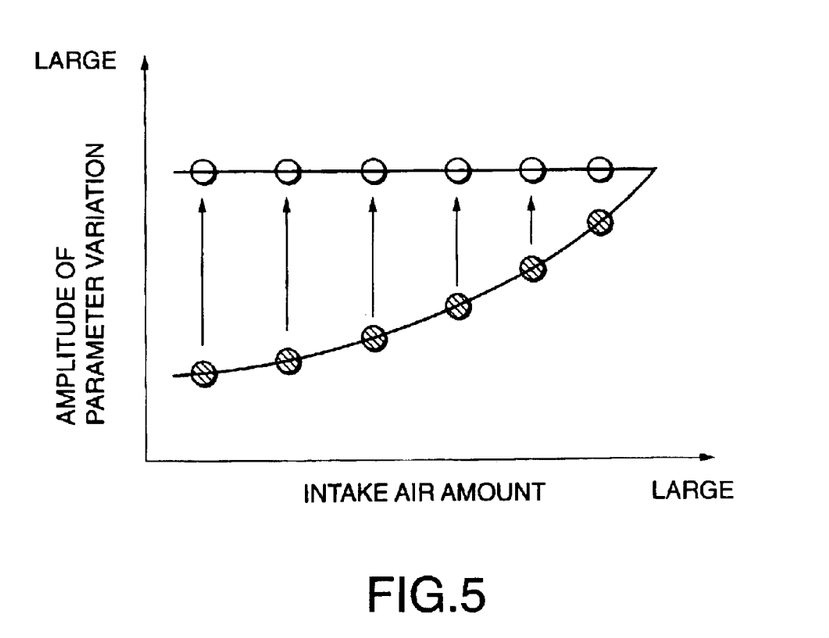
FIG. 5 is a diagram illustrating parameter sensitivity correction according to intake air amount, executed by the controller.

In this deterioration diagnosis routine, a certain degree of intake air amount variation is allowable in the deterioration diagnosis of the air/fuel ratio sensor 4, and therefore correction is applied in accordance with the intake air amount, as is illustrated in FIG. 5, when the actual air/fuel ratio is stored as a parameter in memory so that the diagnosis result has no effect upon variation in the intake air amount.

Figure 6A:
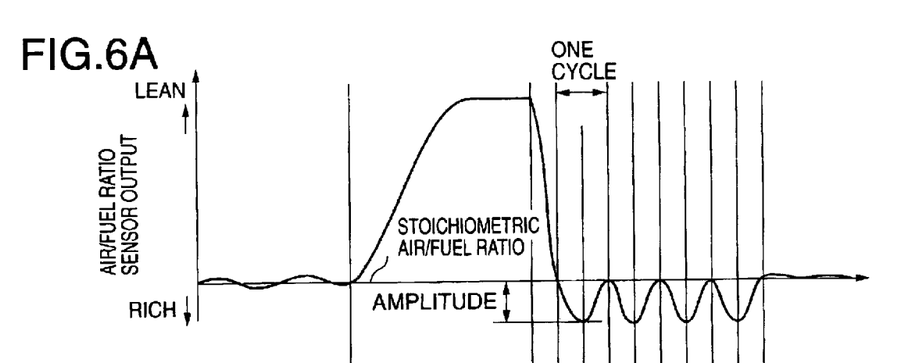
FIGS. 6A through 6D are timing charts illustrating air/fuel ratio change in the diagnosis of deterioration in an air/fuel ratio sensor, executed by the controller.

In the following step S8, a determination is made as to whether the attainment of parameters corresponding to one cycle of air/fuel ratio variation as shown in FIG. 6A has been completed or not. Here, one cycle of air/fuel ratio variation indicates the time period during which the actual air/fuel ratio changes from the stoichiometric air/fuel ratio to the rich air/fuel ratio and returns to the stoichiometric air/fuel ratio.

If the parameters corresponding to one cycle have not been attained, the controller 6 repeats the processing of the steps S4 through S8. Herein, the processing of the steps S4 through S8 is repeated at time intervals of ten milliseconds based on a clock incorporated into the controller 6. The fuel injection by the fuel injector 13 as well as the ignition by the spark plug 14 are performed in synchronism with the Ref signal. The fuel injection pulse signal of which the pulse width is set in the step S5 and the ignition signal of which the output timing is set in the step S6 are respectively output to the fuel injector 13 and the spark plug 14 on the next occasion when they perform fuel injection or ignition.

In the step S8, when the parameters corresponding to one cycle have been attained, the controller 6 calculates in a step S9 an amplitude of the variation of the parameters.

In a following step S10, the controller 6 compares the amplitude of the parameters to a reference value. The reference value here is a value determined experientially on the basis of the output of a non-deteriorated sensor in normal working order.

If the amplitude calculated in the step S9 is larger than the reference value, the controller 6 determines that no deterioration of the sensor has occurred. In this case, the controller 6 terminates the deterioration diagnosis and proceeds to the processing in the step S13.

If in the step S10 the amplitude is not larger than the reference value, however, the air/fuel ratio sensor 4 may have deteriorated. In this case, the controller 6 compares the number of parameters attained since the beginning of deterioration diagnosis, or in other words the cumulative value of the number of times the actual air/fuel ratio has been read from the air/fuel ratio sensor 4, with a predetermined value. Reading of the real air/fuel ratio from the air/fuel ratio sensor 4 is performed at time intervals of ten milliseconds as described hereintofore.

Figure 6B:
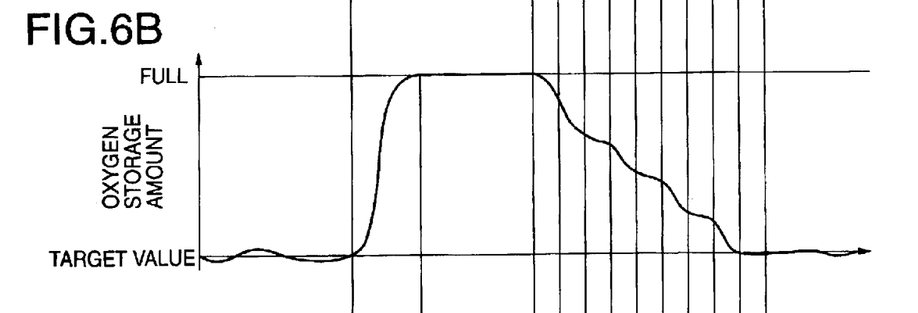
Figure 6C:
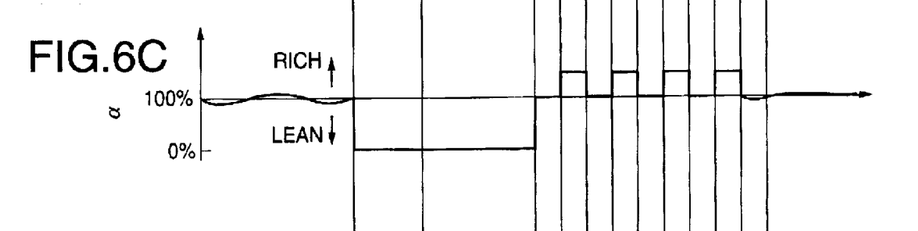
Figure 6D:
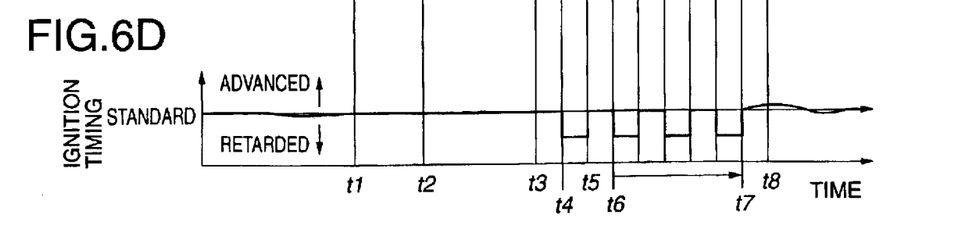

The cumulative value of the number of times the real air/fuel ratio is read from the air/fuel ratio sensor 4 is proportional to the number of times the real air/fuel ratio inverts, or the number of times the processing of the step S10 is executed. Hence the processing in a step S11 is equivalent to determining whether or not the possibility of deterioration in the air/fuel ratio sensor 4 has been determined several times consecutively in the step S10. The number of deterioration determinations is set on the basis of the frequency of deterioration diagnosis, for example. This may also be set on the basis of the amount of time necessary for the oxygen storage amount to fall to the target value during feedback control of the fuel injection amount, as is illustrated in FIG. 6B.

If the number of attained parameters has not reached the predetermined value in the step S11, the controller 6 returns to the step S4 and repeats deterioration diagnosis. If the number of attained parameters has reached the predetermined value in the step S11, the controller 6 determines that the air/fuel ratio sensor 4 has deteriorated, and in a step S12, illuminates a warning light installed in the vehicle to display that the air/fuel ratio sensor 4 has deteriorated. Following the processing of the step S12, the controller 6 performs the processing in the step S13.

The processing of step S13 is executed following completion of deterioration diagnosis or when deterioration diagnosis has been interrupted due to large variation in the engine rotation speed or intake air amount.

In the open-loop control of the fuel injection amount for the purposes of deterioration diagnosis, the stoichiometric air/fuel ratio and the rich air/fuel ratio are alternately applied for a fixed time period, and the real air/fuel ratio is caused to vary between the stoichiometric air/fuel ratio and the rich air/fuel ratio. The processing in the step S13 corresponds to a transitional control for switching from open-loop control of the fuel injection amount to feedback control thereof.

Figure 7A:
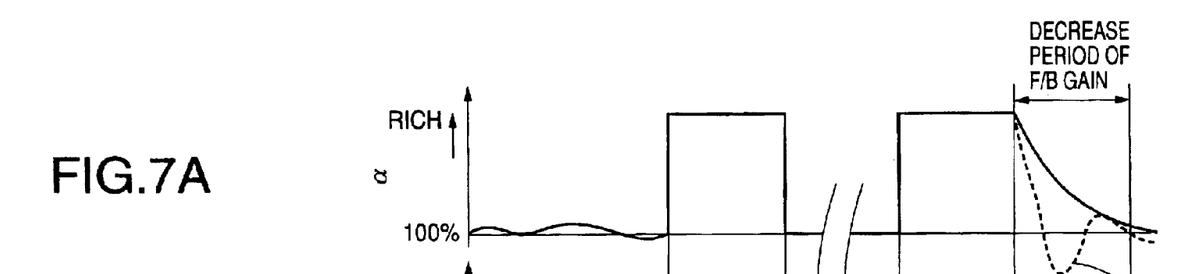
FIGS. 7A and 7B are timing charts illustrating processing for reducing control gain which is implemented following a diagnosis of deterioration in the air/fuel ratio sensor by the controller.
Figure 7B:
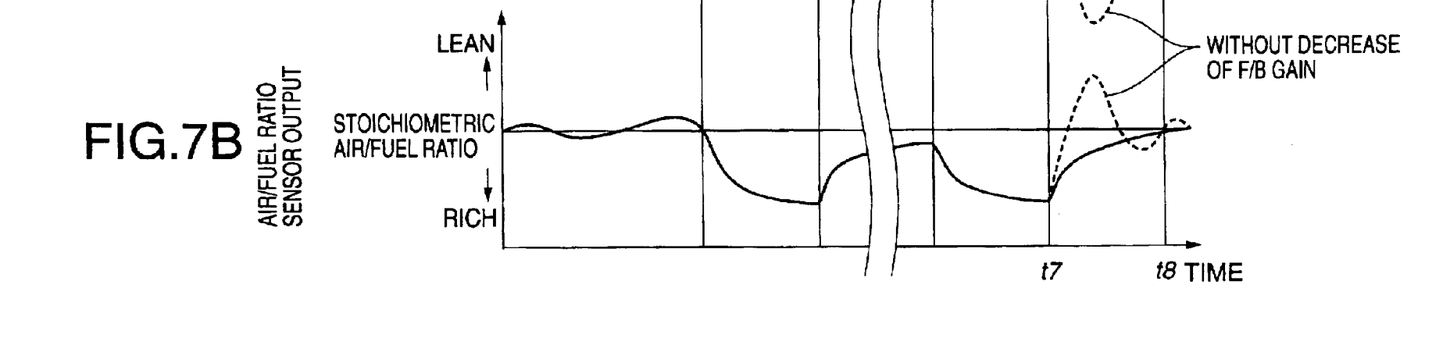

When expression (2) is directly applied to the calculation of the air/fuel ratio feedback correction coefficient α upon switching of the above-mentioned open-loop control for the purpose of deterioration diagnosis to air/fuel ratio feedback control in which the stoichiometric air/fuel ratio is set as the target air/fuel ratio, the target fuel injection pulse width Ti may vary greatly. Referring to FIGS. 7A and 7D, during deterioration diagnosis of the air/fuel ratio sensor 4, the real air/fuel ratio varies to a greater extent than during the time period of air/fuel ratio feedback control. As a result, if normal fuel injection amount feedback control is suddenly applied upon completion of deterioration diagnosis at a time t7 when the rich air/fuel ratio section ends, the difference between the target air/fuel ratio and the actual air/fuel ratio becomes larger than expected in normal fuel injection amount feedback control such that overshoot may occur in subsequent air/fuel ratio changes. Here, overshoot describes a phenomenon in which the real air/fuel ratio temporarily becomes lean, as is shown by the broken line in the drawing, as a result of the fuel injection amount being greatly reduced in response to the detected rich air/fuel ratio. Although overshoot attenuates with time, the occurrence of overshoot itself causes variation in the engine rotation speed and is therefore undesirable.

The processing in the step S13 aims to prevent the overshoot from occurring during the transitional period to return to feedback control from open-loop control of the fuel injection amount.

Specifically, instead of applying expression (2) to the calculation of the air/fuel ratio feedback correction coefficient α, the following expression (3) for the transitional period is applied.

$$\alpha = dAF \cdot PGain \cdot PGdwn + \Sigma dAF \cdot IGain \cdot IGdwn + \Delta dAF \cdot DGain \cdot DGdwn + 1 \qquad (3)$$

where, PGdwn=proportionate gain reduction coefficient=0,
IGdwn=integral gain reduction coefficient=0.5, and
DGdwn=derivative gain reduction coefficient=0.

To summarize expression (3), during the transitional period from open-loop control of the fuel injection amount to feedback control, the air/fuel ratio feedback correction coefficient α is determined on the basis of only half the value of the integral gain during normal feedback control. As a result, change in the air/fuel ratio becomes smooth, as is shown by the solid line in FIGS. 7A and 7B, and overshoot does not occur.

This transitional control is executed over a time period set in advance. Setting may also be performed such that this processing is executed until the difference between the real air/fuel ratio detected by the air/fuel ratio sensor 4 and the stoichiometric air/fuel ratio equals or falls below a fixed value.

Referring to FIGS. 6A through 6D, air/fuel ratio change under the aforementioned deterioration diagnosis routine will be explained.

At or before a time t1, fuel injection amount feedback control based on the difference between the real air/fuel ratio detected by the air/fuel ratio sensor 4 is executed. At this time point, the actual air/fuel ratio is maintained in the vicinity of the stoichiometric air/fuel ratio which is the target air/fuel ratio, and the oxygen storage amount is also maintained in the vicinity of the target amount. If a fuel cut is executed at time t1, the oxygen storage amount in the target air/fuel ratio increases rapidly. At a time t2, the oxygen storage amount reaches the maximum amount.

When the fuel cut ends at a time t3, feedback control of the fuel injection amount is executed again. As a result, when the air/fuel ratio matches the stoichiometric air/fuel ratio at a time t4, feedback control of the fuel injection amount is interrupted and a deterioration diagnosis of the air/fuel ratio sensor 4 begins. The real air/fuel ratio detected by the air/fuel ratio sensor 4 first reaches a minimum value peak at a time t5, which is the end point of the first rich air/fuel ratio section during the deterioration diagnosis period, and reaches a maximum value peak at a time t6, which is the end point of the following stoichiometric air/fuel ratio section. If the amplitude of real air/fuel ratio variation in this one cycle is equal to or less than the reference value, the controller 6 determines that the air/fuel ratio sensor 4 may have deteriorated, and thus continues deterioration diagnosis while alternating subsequent rich air/fuel ratio sections and stoichiometric air/fuel ratio sections.

At a time t7, deterioration diagnosis is terminated or interrupted. Termination indicates that the controller 6 determines the air/fuel ratio sensor 4 to have deteriorated in the step S11, or that the air/fuel ratio sensor 4 is determined not to have deteriorated in the step S10 prior to the cumulative number of attained parameters reaching the predetermined value. Interruption indicates that great variation has been detected in the engine rotation speed or intake air amount in the step S4 during deterioration diagnosis.

At time t7, when deterioration diagnosis is terminated or interrupted, feedback control of the fuel injection amount in which the stoichiometric air/fuel ratio is set as the target air/fuel ratio is restarted. At this time, the controller 6 applies the transitional control of the fuel injection amount by applying expression (3) to the air/fuel ratio feedback correction coefficient α rather than expression (2), thereby causing the peak position rich air/fuel ratio to change smoothly and without overshoot to the stoichiometric air/fuel ratio. In so doing, stable feedback control of the fuel injection amount is performed from a time t8 onward.

The contents of Tokugan 2002-53237, with a filing date of Feb. 28, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, the engine 1 to which this invention is applied comprises two catalytic converters 3A and 3B as described above. However, this invention is also applicable to an engine comprising a single catalytic converter.

The embodiments of this invention in which an exclusive property or privilege is claimed are defined as follows:

What is claimed is:

1. A deterioration diagnosis method of an air/fuel ratio sensor for use with an internal combustion engine which burns an air/fuel mixture of fuel injected by an injector and air, and discharges combustion gas through an exhaust passage as exhaust gas, the engine comprising a catalytic converter provided in the exhaust passage and having an oxygen storage function, wherein the air/fuel ratio sensor is disposed in the exhaust passage upstream of the catalytic converter for detecting an air/fuel ratio of the air-fuel mixture, the deterioration diagnosis method comprising:

determining whether a fuel cut, during which fuel is not injected by the fuel injector while the engine is running, has been executed or not;

controlling a fuel injection amount of the fuel injector only immediately after an execution of a fuel cut to cause the engine to be operated under an alternating application of a rich air/fuel ratio and a non-rich air/fuel ratio; and performing a diagnosis of deterioration in the air/fuel ratio sensor based on a variation in the air/fuel ratio detected by the air/fuel ratio sensor during the period in which the engine is operated under the alternating application of the rich air/fuel ratio and the non-rich air/fuel ratio.

2. A deterioration diagnosis device of an air/fuel ratio sensor for use with an internal combustion engine which burns an air/fuel mixture of fuel injected by an injector and air, and discharges combustion gas through an exhaust passage as exhaust gas, the engine comprising a catalytic converter provided in the exhaust passage and having an oxygen storage function, wherein the air/fuel ratio sensor is disposed in the exhaust passage upstream of the catalytic converter for detecting an air/fuel ratio of the air-fuel mixture, the deterioration diagnosis device comprising:

means for determining whether a fuel cut, during which fuel is not injected by the fuel injector while the engine is running, has been executed or not;

means for controlling a fuel injection amount of the fuel injector only immediately after an execution of a fuel cut to cause the engine to be operated under an alternating application of a rich air/fuel ratio and a non-rich air/fuel ratio; and means for performing a diagnosis of deterioration in the air/fuel ratio sensor based on a variation in the air/fuel ratio detected by the air/fuel ratio sensor during the period in which the engine is operated under the alternating application of the rich air/fuel ratio and the non-rich air/fuel ratio.

3. A deterioration diagnosis device of an air/fuel ratio sensor for use with an internal combustion engine which burns an air/fuel mixture of fuel injected by an injector and air, and discharges combustion gas through an exhaust passage as exhaust gas, the engine comprising a catalytic converter provided in the exhaust passage and having an oxygen storage function, wherein the air/fuel ratio sensor is disposed in the exhaust passage upstream of the catalytic converter for detecting an air/fuel ratio of the air-fuel mixture, the deterioration diagnosis device comprising:

a controller functioning to:

determine whether a fuel cut, during which fuel is not injected by the fuel injector while the engine is running, has been executed or not;

control a fuel injection amount of the fuel injector only immediately after an execution of a fuel cut to cause the engine to be operated under an alternating application of a rich air/fuel ratio and a non-rich air/fuel ratio; and perform a diagnosis of deterioration in the air/fuel ratio sensor based on a variation in the air/fuel ratio detected by the air/fuel ratio sensor during the period in which the engine is operated under the alternating application of the rich air/fuel ratio and the non-rich air/fuel ratio.

4. The deterioration diagnosis device as defined in claim 3, wherein the controller further functions to execute, following the diagnosis, feedback control of the fuel injection amount in which a stoichiometric air/fuel ratio is set as a target air/fuel ratio in accordance with a difference between the air/fuel ratio detected by the air/fuel ratio sensor and the stoichiometric air/fuel ratio based on a predetermined gain, and immediately after a commencement of the feedback control of the fuel injection amount, to temporarily reduce the predetermined gain.

5. The deterioration diagnosis device as defined in claim 3, wherein the controller further functions to determine that the air/fuel ratio sensor has deteriorated when an amplitude of variation in the air/fuel ratio detected by the air/fuel ratio sensor is smaller than a reference value.

6. The deterioration diagnosis device as defined in claim 3, wherein the catalytic converter comprises a three-way catalyst which performs optimum exhaust gas purification in an exhaust gas composition corresponding to a stoichiometric air/fuel ratio, and the oxygen storage function of the catalytic converter is a function to store oxygen in the exhaust gas when the oxygen concentration in the exhaust gas corresponds to the non-rich air/fuel ratio, and releasing the stored oxygen when the oxygen concentration in the exhaust gas corresponds to the rich air/fuel ratio.

7. The deterioration diagnosis device as defined in claim 3, wherein the controller further functions to prevent the diagnosis from being performed until an oxygen storage amount of the catalytic converter reaches a maximum amount.

8. The deterioration diagnosis device as defined in claim 3, wherein the non-rich air/fuel ratio is a stoichiometric air/fuel ratio.

9. The deterioration diagnosis device as defined in claim 8, wherein the engine further comprises a spark plug for igniting the air/fuel mixture, and the controller further functions to control the spark plug to cause an ignition timing during the application of the rich air/fuel ratio to be retarded in comparison with an ignition timing during the application of the stoichiometric air/fuel ratio.

10. The deterioration diagnosis device as defined in claim 3, wherein the device further comprises a sensor which detects a running condition of the engine, and the controller further functions to interrupt the diagnosis when the running condition varies in excess of a predetermined range.

11. The deterioration diagnosis device as defined in claim 10, wherein the running condition detecting sensor comprises either one of a sensor which detects a rotation speed of the engine and a sensor which detects an intake air amount of the engine.

* * * * *